Dec. 17, 1935.  E. M. WILSON  2,024,558

ELECTRICAL CONDENSER AND METHOD OF MAKING SAME

Filed March 13, 1934

INVENTOR
E. M. WILSON
BY
E. R. Nowlan
ATTORNEY

Patented Dec. 17, 1935

2,024,558

UNITED STATES PATENT OFFICE 2,024,558

ELECTRICAL CONDENSER AND METHOD OF MAKING SAME

Ellsworth M. Wilson, Montclair, N. J., assignor to Western Electric Company, Incorporated, New York, N. Y., a corporation of New York Application March 13, 1934, Serial No. 715,281

3 Claims. (Cl. 175—41)

This invention relates to electrical condensers and a method of making them, and more particularly to an electrical condenser adjusted during manufacture to have a precisely predetermined electrostatic capacity, and to a method of simultaneously adjusting and testing during manufacture.

Objects of the invention are to produce electrical condensers of predetermined fixed electrostatic capacity and a novel type of part therefor and to provide a method therefor which is simple, reliable and rapid.

With this and other objects in view, one embodiment of the invention may take the form of a well known type of electrical condenser having a stack of alternate laminæ of mica and metal foil in which one or more of the metal laminæ is replaced by a lamellar structure of metallic elements such as wires, ribbons, tapes or the like so formed or associated that one or more single elements (wires, tapes, or the like) may be gradually withdrawn therefrom without materially disturbing the rest of the lamella, thus continuously altering the electrostatic capacity of the stack. The withdrawal is stopped when the desired capacity is attained and the condenser then clamped and finished. This adjustment may be made in a clamp or press during the final assembly of the condenser and with a testing device attached and in operation while the adjustment is being made.

Other objects and characteristic features of the invention will appear clearly from the following detailed description of one form of the invention taken in connection with the annexed drawing in which the same reference numerals are applied in the several figures to identical or homologous parts and in which Fig. 1 is a view in front elevation of an assembled condenser constructed in accordance with the invention, held in a clamp and connected to an electrical testing device;

Figure 1:
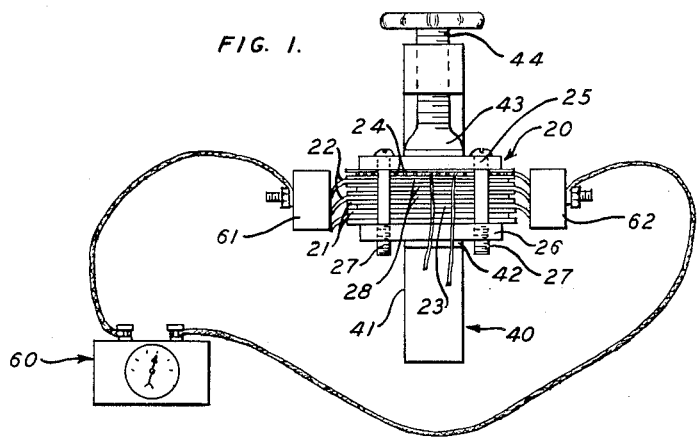
Figure 2:
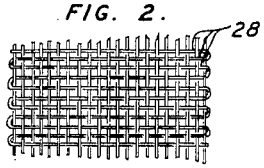
Fig. 2 is a plan view of the adjustable metal lamella of Fig. 1.

In the invention as disclosed in Figs. 1 and 2, reference numeral 20 indicates generally a nearly finished electrical condenser held in a clamp generally indicated by the numeral 40 and having a capacity testing device generally indicated by 60 attached to the condenser. The condenser comprises a stack consisting of alternate laminæ of mica 21 and sheet metal 22. Alternate metal laminæ extend laterally beyond the intercalated mica laminæ on opposite sides of the stack to be ultimately brought together and connected to the working terminals of the finished condenser. As shown in Fig. 1, however, one set of alternate metal leaves is connected to one lead 61 of the testing set 60 and the other set of metal leaves is connected to the other lead 62 of the testing device. The whole stack is held for convenience in the clamping device 40 which comprises a frame 41, a fixed jaw 42, and a movable jaw 43 which is controlled in familiar fashion by a screw 44. The nature of the clamping device 40 is not material to the invention and may evidently be of any appropriate and well known form and arrangement.

One of the metallic laminæ 22 is replaced by a special adjustable lamellar element 23, shown in Figs. 1 and 2 as a rectangular piece of netting formed of interwoven wires and having a plurality of mutually independent warp wires 24 interwoven with a single continuous woof wire 28.

The stack of mica and metal elements having been assembled as shown with a relatively heavy and rigid end plate 25 and 26 at each end of the stack, and placed in the clamp 40, the condenser assembly screws 27 are inserted into the holes provided therefor in the plates 25 and 26, the holes in the upper plate 25 being smooth and the holes in the lower plate 26 being threaded to coact with the screws 27. The test leads 61 and 62 are connected as shown and the testing current turned on. The clamp screw 44 is then operated to bring pressure on the condenser to an amount such that warp wires 24 may just be conveniently withdrawn one at a time from the ravelable lamella 23.

The condenser as originally stacked and partially pressed in the device 40 should have an electrostatic capacity a trifle in excess of that desired in the finished condenser. The unravelling or withdrawal of parts from the adjustable lamella 23 is continued until the testing device shows the condenser has the desired capacity. The excess wire or other material may then be clipped off, the clamp tightened completely and the screws 27 driven home.

Since further pressure is thus applied after the capacity adjustment is completed, it may be necessary in some instances to make allowance during the adjustment for the usually trifling increase in capacity thus produced after the adjustment is made. However, this allowance is substantially constant for any one type and size of condenser provided the adjustment pressures and the final pressures are constant.

The lamella 23 as shown in Figs. 1 and 2, is a piece of woven wire tape having two selvage edges and two cut edges thus making the warp wires mutually independent and the woof wire a single continuous piece. Obviously the adjustment may also be made by pulling out as much as necessary of the woof wire, or by removing both part of the warp wires and a part of the woof wire. Obviously also lamella 23 need not have any selvage edges. Furthermore, instead of round wires, the lamella may be composed in part or in whole of flat tapes, ribbons, or other strand material. The requisite and characteristic feature is that the lamella 23 be so constructed that a portion thereof may be withdrawn or otherwise gradually removed while the lamella itself is in situ in the condenser stack and the whole assembly is under test, the whole being locked together finally after adjustment.

Figure 3:
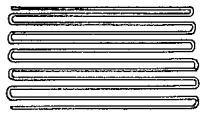
Fig. 3 is a plan view of another form of lamella.
Figure 4:
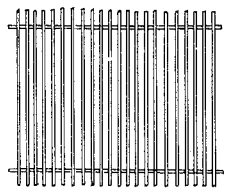
Fig. 4 is a plan view of a third form of lamella.
Figure 5:
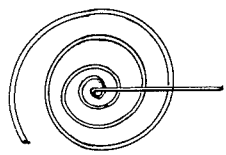
Fig. 5 is a plan view of a fourth form of lamella.
Figure 6:
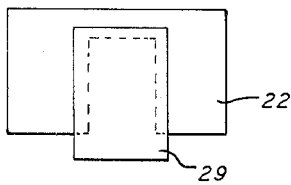
Fig. 6 is a plan view of a fifth form of lamella.

Other possible ways of making the lamella 23 are shown in Figs. 3, 4, 5 and 6. Thus Fig. 3 shows an adjustable lamella comprising merely a single wire or ribbon doubled back and forth. Fig. 4 shows a lamella consisting of a group of parallel strands with two superimposed but not interwoven connecting strands. Fig. 5 shows a lamella consisting of a single wire wound in a flat spiral. In Fig. 6 a foil 22 has a notch cut therein and covered with a withdrawable sliding piece of foil 29.

The testing device 60 is not disclosed or described in detail since such instruments are familiar and well known. It might comprise a source of alternating current feeding a four armed bridge of which two standard coils and a standard condenser would be three arms and the condenser to be tested would be the fourth, while a voltmeter or ammeter of appropriate design and sensitivity would be in the bridge circuit.

The embodiments of the invention herein disclosed are illustrative merely and may be modified and departed from in many ways without departing from the scope and spirit of the invention as pointed out in and limited only by the appended claims.

What is claimed is:

1. An electrical condenser comprising alternate laminæ of dielectric material and metal respectively, one metal lamina being a lamellar structure of ravelable nature whereby a portion of the ravelable laminæ may be withdrawn for capacity adjustment of the condenser.

2. An electrical condenser comprising alternate laminæ of dielectric material and metal respectively, one metal lamina being a lamellar structure of mutually associated strands whereby a part of the strands may be withdrawn for capacity adjustment of the condenser.

3. An electrical condenser comprising alternate laminæ of dielectric material and metal respectively, one metal lamina being a lamellar structure of strand material whereby a part of the strands material may be withdrawn for capacity adjustment of the condenser.

ELLSWORTH M. WILSON.